April 12, 1966 I. J. P. JAMES 3,246,078

COLOUR TELEVISION RECEIVERS

Filed Jan. 8, 1962

5 Sheets-Sheet 1

$$\frac{E_Y'}{E_Y^{1/8}} = \frac{0{\cdot}3E_R^{1/8} + 0{\cdot}59E_G^{1/8} + 0{\cdot}11E_B^{1/8}}{(0{\cdot}3E_R + 0{\cdot}59E_G + 0{\cdot}11E_B)^{1/8}} = (K_1)^{1/8}$$

$$\frac{1}{E_Y^{1/\gamma}}\left\{\left[0.493(E_B^{1/\gamma}-E_Y^{1/\gamma})\right]^2+\left[0.877(E_R^{1/\gamma}-E_Y^{1/\gamma})\right]^2\right\}^{1/2}, \quad \tan^{-1}\frac{0.877(E_R^{1/\gamma}-E_Y^{1/\gamma})}{0.493(E_B^{1/\gamma}-E_Y^{1/\gamma})}$$

$$E_Y^{1/\gamma}=(0.3E_R+0.59E_G+0.11E_B), \quad \gamma=2.2$$

April 12, 1966 I. J. P. JAMES 3,246,078

COLOUR TELEVISION RECEIVERS

Filed Jan. 8, 1962 5 Sheets-Sheet 5

3,246,078

COLOUR TELEVISION RECEIVERS

Ivanhoe John Penfound James, London, England, assignor to Electric & Musical Industries Limited, Hayes, England, a company of Great Britain Filed Jan. 8, 1962, Ser. No. 164,894
Claims priority, application Great Britain, Mar. 2, 1961, 7,568/61; Oct. 12, 1961, 36,594/61
8 Claims. (Cl. 178—5.4)

This invention relates to colour television receivers.

Various specifications have been proposed for the waveforms to be used for colour television transmission. One well known specification is the so-called N.T.S.C. specification in which the transmitted waveform is modulated by a luminance component signal and an oscillation produced by modulating two phases of a subsidiary carrier wave by two colour difference signal components. The luminance component is produced by adding different proportions of component colour signals after the latter have been gamma corrected. Such a method of forming the luminance signal is consistent with the use of a camer having three pick-up tubes which are sensitive respectively to the red, green and blue components of the scene but advantage can be obtained by arranging that one of the pick-up tubes produces the luminance signal directly, thereby minimising registration errors in the luminance signal. Such a proposal lends itself to the transmission of a gamma corrected luminance signal which can be regarded as composed of different proportions of component colour signals which are added together before gamma correction. The video information in such a case would then be transmitted by means of two narrow band and one wide band signal which can be expressed as follows:

(a) $E_R^{1/\gamma}-E_Y^{1/\gamma}$ (b) $E_B^{1/\gamma}-E_Y^{1/\gamma}$ (c) $E_Y^{1/\gamma}$ the signal (c) being the wide band signal. In this relationship $$E_Y^{1/\gamma}=(lE_R+mE_G+nE_B)^{1/\gamma}$$

$l$, $m$, $n$ being suitable numerical multiplying factors, which factors will be assumed to be 0.30, 0.59 and 0.11 respectively.

Moreover the signal $E_Y^{1/\gamma}$ is that which is most suitable for reproduction in a monochromatic receiver. Nevertheless, difficulty arises in the case of receivers designed to receive a waveform according to the N.T.S.C. specification. Such a receiver if used for the production of a colour signal wherein the luminance component is of the form $E_Y^{1/\gamma}$, would reproduce $E_R^{1/\gamma}$ and $E_B^{1/\gamma}$ correctly but would be in error in reproducing the signal which should represent $E_G^{1/\gamma}$. Thus the matrixing circuit in a N.T.S.C. receiver would perform the following operations on the transmitted signals (a), (b) and (c):

$$(a)+(c)=E_R^{1/\gamma} \text{ correctly}$$

$$(b)+(c)=E_B^{1/\gamma} \text{ correctly}$$

$$1.7[(c)-0.3\{(a)+(c)\}-0.11\{(b)+(c)\}] =E_G^{1/\gamma}+1.7(E_Y^{1/\gamma}-E_Y') \text{ incorrectly}$$

The last mentioned signal produced by the decoding operations will be denoted as $E_V^{1/\gamma}$ and in the expression for this signal it is to be noted that $$E_Y'=lE_R^{1/\gamma}+mE_G^{1/\gamma}+nE_B^{1/\gamma}$$

where $l$, $m$ and $n$ have the same values as the corresponding multiplying factors in the formula for $E_Y^{1/\gamma}$.

From the foregoing it is clear, that if an N.T.S.C. receiver is employed as suggested the more saturated colours will exhibit a tendency to shift towards green, and it will not be possible to correct for this effect simultaneously by means of the adjustments normally provided on such a receiver.

It is an object of the present invention to provide a simple and inexpensive matrixing circuit for a colour television receiver which, in response to a colour signal of which the luminance component is of the form $E_Y^{1/\gamma}$, can provide colour or colour difference component signals the green component of which is less in error than would be the case if produced by an N.T.S.C. matrixing circuit.

According to the present invention there is provided a matrixing circuit for a colour television receiver comprising input means responsive to a received colour television waveform for providing a luminance signal component representing $E_Y^{1/\gamma}$ and two other signal components which represent respectively two colour differences from $E_Y^{1/\gamma}$, and substantially linear means responsive to said three signal components for deriving colour signal components representing respectively $E_R^{1/\gamma}$, $E_B^{1/\gamma}$ and $E_G^{1/\gamma}$ said substantial linear means including means for subtracting from the signal component which would otherwise represent $E_G^{1/\gamma}$, a correcting signal which is zero for white or grey parts of the picture to be reproduced and which increases with increased colour saturation of the picture to be reproduced.

From the above relationship which gives the composition of the signal $E_Y^{1/\gamma}$ it will be seen that its amplitude exceeds that of the desired signal $E_G^{1/\gamma}$ by the amount 1.7 $(E_Y^{1/\gamma}-E_Y')$. In practice $E_Y^{1/\gamma}$ is never less than $E_Y'$. It can be shown moreover that the ratio $E_Y'/E_Y^{1/\gamma}$ is unity for illuminant C which is expressed by the relationship $E_R=E_G=E_B=1$ and that the ratio decreases with saturation. Conversely the error in the green signal is zero for illuminant C and increases with saturation. In principle the error in the green signal can be made zero at every point of the chromaticity diagram if the signal $E_Y^{1/\gamma}$ used for the formation of the green signal is first multiplied by the ratio $E_Y'/E_Y^{1/\gamma}$ appropriate to that point. However if the colour transmission comprises the signals (a), (b) and (c) referred to above the ratio $E_Y'/E_Y^{1/\gamma}$ cannot be made available in the receiver without a complex circuit. The present invention is therefore based on the principle of using the general property that the ratio decreases and the error increases with increasing saturation to produce a correction which is sufficiently accurate for practical purposes.

According to another aspect of the present invention there is provided a matrixing circuit for a colour television receiver comprising input means responsive to a received colour television waveform for providing a luminance signal component and two colour difference signal components, means responsive to said two colour difference signal components for deriving a third colour difference signal component, a cathode ray tube capable of reproducing pictures in colour, means for applying said three colour difference components and said luminance signal component to said cathode ray tube to reproduce a coloured picture, means responsive to at least one signal component provided by said input means for providing a correcting signal which is zero for white or grey parts of the picture to be reproduced and which increases with increasing colour saturation of the picture to be reproduced and means responsive to said correcting signal for modifying the colour of picture elements so as to reduce the output of one colour which would otherwise be effected by said cathode ray tube relative to the output of another colour, said reduction increasing with increasing colour saturation.

In order that the present invention may be clearly understood and readily carried into effect it will now be more fully described with reference to the accompanying drawings, in which.

As has been indicated, if a colour video waveform comprising the components (a), (b) and (c) defined above is decoded by additive matrixing as in a conventional N.T.S.C. receiver, the actual green signal $E_V^{1/\gamma}$ produced by the receiver exceeds the required green signal $E_G^{1/\gamma}$ in amplitude by the amount 1.7 $(E_Y^{1/\gamma}-E_Y')$. This can be expressed in the form $$1.7\, E_Y^{\frac{1}{\gamma}}\left(1-\frac{E_Y'}{E_Y^{\frac{1}{\gamma}}}\right)$$

The error per unit luminance is therefore equal to $$1.7\left(1-\frac{E_Y'}{E_Y^{\frac{1}{\gamma}}}\right)$$

Figure 2:
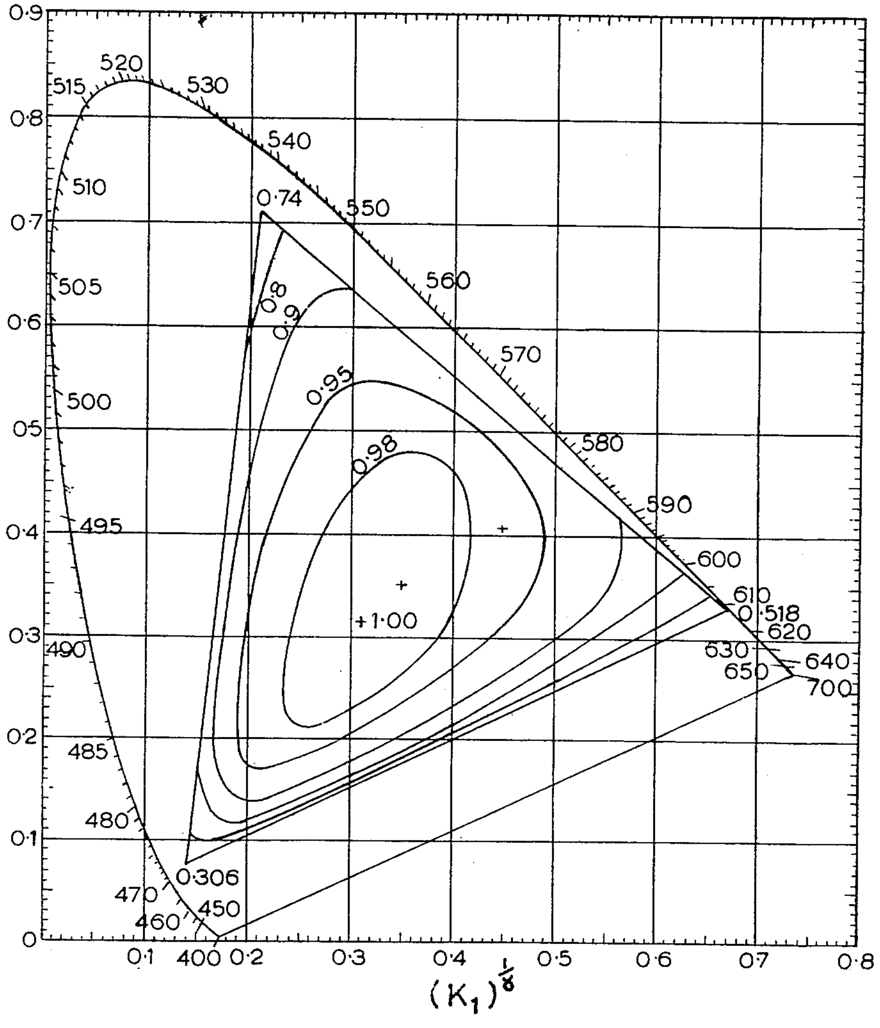
FIGURE 2 is another diagram which will be referred to in the following description.

The function $$\frac{E_Y'}{E_Y^{1/\gamma}}$$

is plotted in FIGURE 2.

Figure 1:
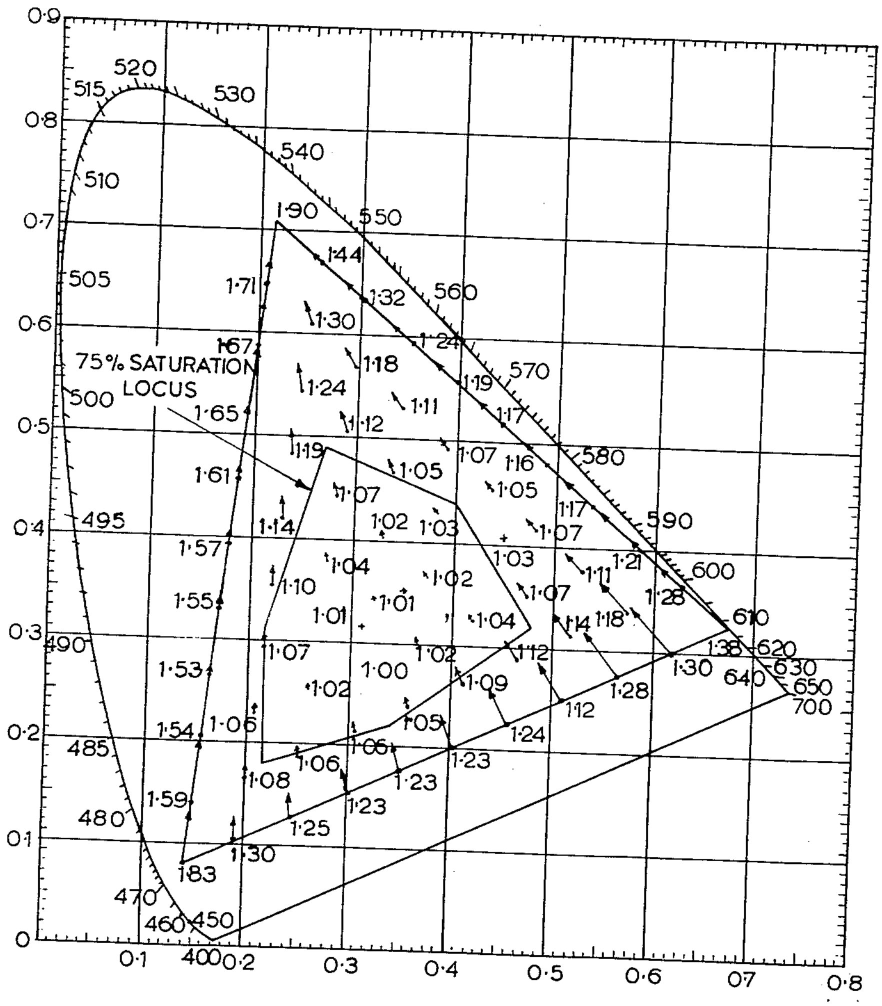
FIGURE 1 illustrates on a C.I.E. chromaticity diagram, the colour errors produced by a normal N.T.S.C. colour television receiver, when correctly adjusted to display gamma correlated luminance and colour signals.

The colour errors produced by an N.T.S.C. receiver when reproducing a signal having the components (a) (b) and (c) above, when $\gamma 2.2$, are illustrated in FIGURE 1 on a C.I.E. (Commision Internationale de l'éclairage) chromaticity diagram. The receiver will reproduce correctly a standard white signal transmitted by the system. Each dot represents an original colour. The arrow attached to each dot represents the direction of change in chromaticity of the colour when reproduced by the N.T.S.C. receiver and the length of the arrow is proportional to the amount of the shift in chromaticity. The numbers against the dots are the ratio of the reproduced luminance to the original luminance and clearly, the closer this ratio is to unity the greater is the luminance fidelity at that point. The locus of chromaticity points corresponding to all colours whose saturation is 75 percent is shown on the diagram, being labelled "saturation locus."

It will be observed that colours lying inside the 75 percent saturation locus, are reproduced with little or no error, but that colours lying outside this locus display an increasing shift towards green and suffer a reproduced luminance which is relatively greater than the original luminance. It will also be observed that the tendency for the luminance to increase becomes greater as the colours approach the green primary. When applied to the operation of an N.T.S.C. receiver, these observations mean that the green signal must be reduced in relation to the red and the blue signals as the saturation increases, in order to reduce or remove these errors.

Figure 3:
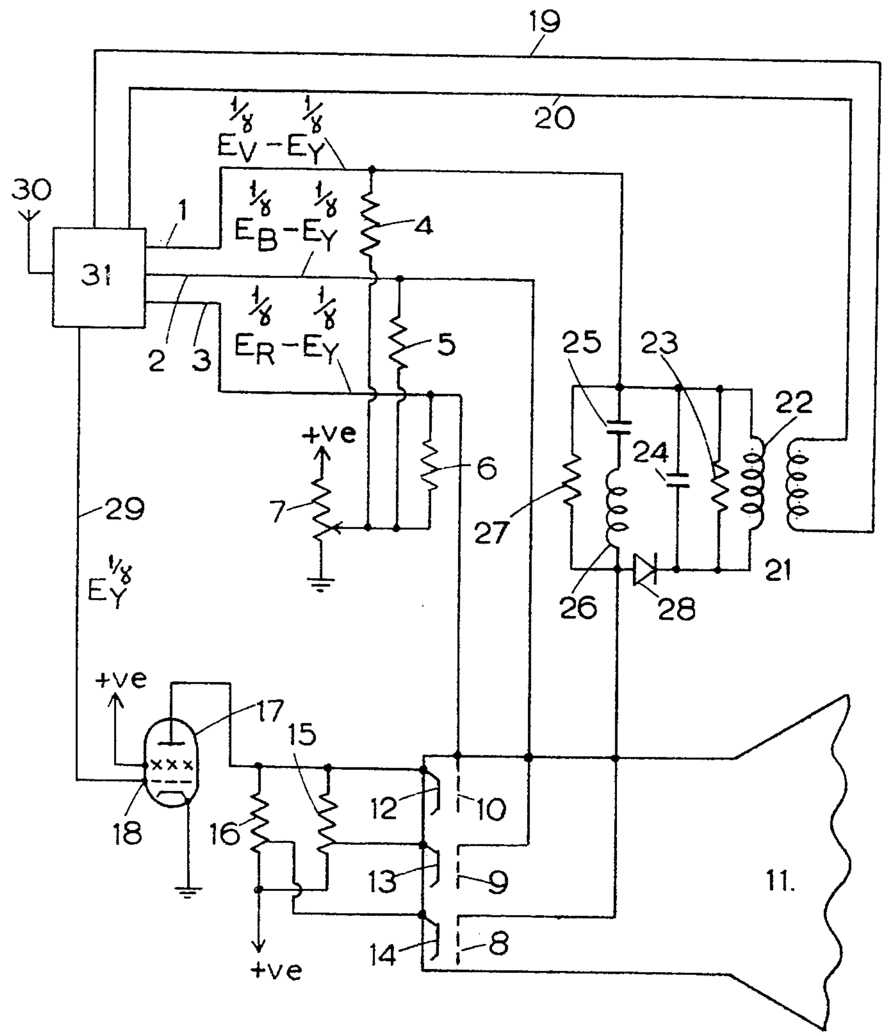
FIGURE 3 illustrates a colour television receiver generally of N.T.S.C. type but embodying a matrixing circuit according to one example of the present invention.

Referring now to FIGURE 3, transmitted composite colour signals are picked by aerial 30 and fed to a standard N.T.S.C. receiver 31, in which the received signals are amplified and demodulated in known manner to give the luminance signal at 29 and three colour difference signals at 1, 2 and 3. If the luminance component (c) is modulated on to a main carrier wave and colour difference components (a) and (b) are modulated onto a chrominance subcarrier wave in the manner usually employed for transmitting the N.T.S.C. colour signal, then the output at 29 will be $E_Y^{1/\gamma}$, and the outputs 1, 2 and 3 will comprise $E_V^{1/\gamma}-E_Y^{1/\gamma}$, $E_B^{1/\gamma}-E_Y^{1/\gamma}$ and $E_R^{1/\gamma}-E_Y^{1/\gamma}$ respectively.

The blue and red difference signals from 2 and 3 are applied directly to the grids 9 and 10 of three gun colour reproducing tube 11. The gamma corrected luminance signal from 29 is applied to the grid 18 of video amplifier valve 17. The amplified luminance signal is applied to the cathode 12 of the red gun and to the cathodes 13, 14 of the blue and green guns via potentiometers 15 and 16, respectively, so that the relative drive amplitudes may be readily adjusted. The grids 8, 9 and 10 of the colour reproducing tube 11 are provided with bias from the potentiometer 7 via grid leads 4, 5 and 6.

A sample of the chrominance subcarrier before demodulation is taken from a suitable point in receiver 31 and is fed via terminals 19 and 20 to transformer 21, whose secondary 22 is tuned to the subcarrier frequency by condenser 24 and is damped by resistor 23 to provide a sufficient bandwidth. The chrominance subcarrier voltage appearing across the secondary 22 of the transformer 21 is rectified by the rectifier 28 and a unidirectional voltage is thus set up across the rectifier load resistor 27 whose amplitude is substantially proportional to the amplitude of the chrominance subcarrier. Condenser 25 and inductance 26 form a series circuit tuned to the chrominance subcarrier frequency to remove this frequency component, as it would otherwise produce a dot pattern on the picture. This voltage, which is dependent on the colour saturation together with the luminous intensity, is connected in series with the erroneous green difference signal $E_V^{1/\gamma}-E_Y^{1/\gamma}$, derived from terminal 1, in subtractive relationship, so that the green difference signal applied to the grid 8 of the green gun will be reduced relatively by an amount dependent on the colour saturation, and many consequently provide a truer colour rendering of the more saturated colours.

In one form of transmission the colour video signal is specified by the equation $$E_M=E_Y^{1/\gamma}+0.493\ (E_B^{1/\gamma}-E_Y^{1/\gamma})\ \sin \mathrm{wt.} +0.877\ (E_R^{1/\gamma}-E_Y^{1/\gamma})\ \cos \mathrm{wt.}$$

Figure 4:
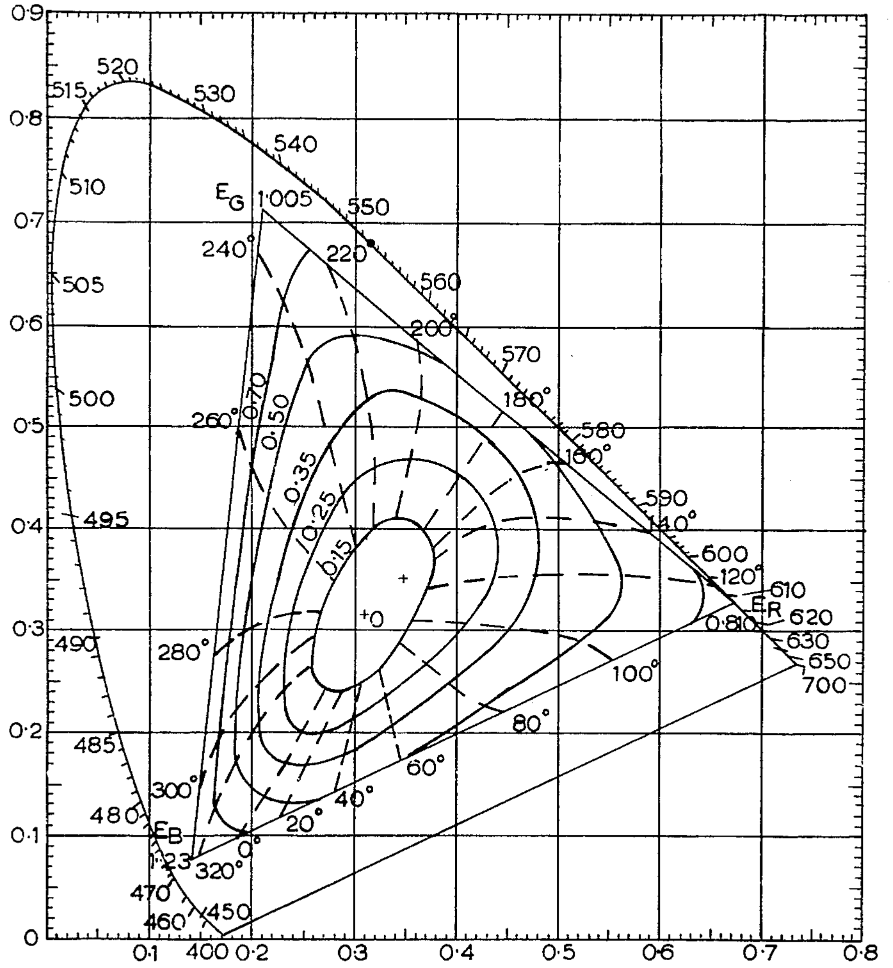
FIGURE 4 is yet another diagram which will be referred to in the following description.

The amplitude of the sub-carrier per unit luminance signal is given by the expression $$\frac{1}{E_Y^{\frac{1}{\gamma}}}\{[(0.493(E_B^{1/\gamma}-E_Y^{1/\gamma})]^2+[0.877(E_R^{1/\gamma}-E_Y^{1/\gamma})]^2\}^{1/2}$$

and is plotted in FIGURE 4.

In such a case it is found that if approximately ⅕ of the subcarrier amplitude is used as the correction signal then the reproduced errors are considerably reduced.

In N.T.S.C. colour television receivers, with shadow mask tubes, a detecting and matrixing circuit operating on the so-called XZ system is sometimes used. This circuit comprises three valves having a common cathode resistance and the chrominance sub-carrier wave demodulated with reference to the X and Z axes are applied respectively to the control electrodes of two of these valves, and an effectively zero signal is applied to the control electrode of the third valve. The arrangement is such that the outputs from the three valves are proportional respectively to $$E_R^{1/\gamma}-E_Y^{1/\gamma},\ E_G^{1/\gamma}-E_Y' \text{ and } E_B^{1/\gamma}-E_Y'$$

where these symbols have the usual significance.

Figure 5:
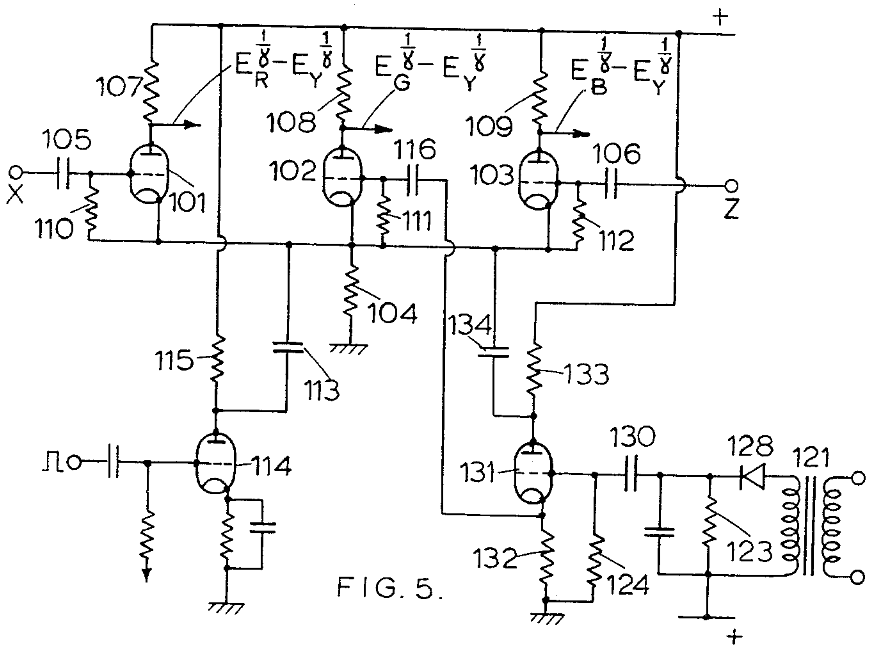
FIGURE 5 illustrates another form of martixing circuit in accordance with the invention which may be employed in a colour television receiver otherwise similar to a conventional N.T.S.C. type receiver.
Figure 6:
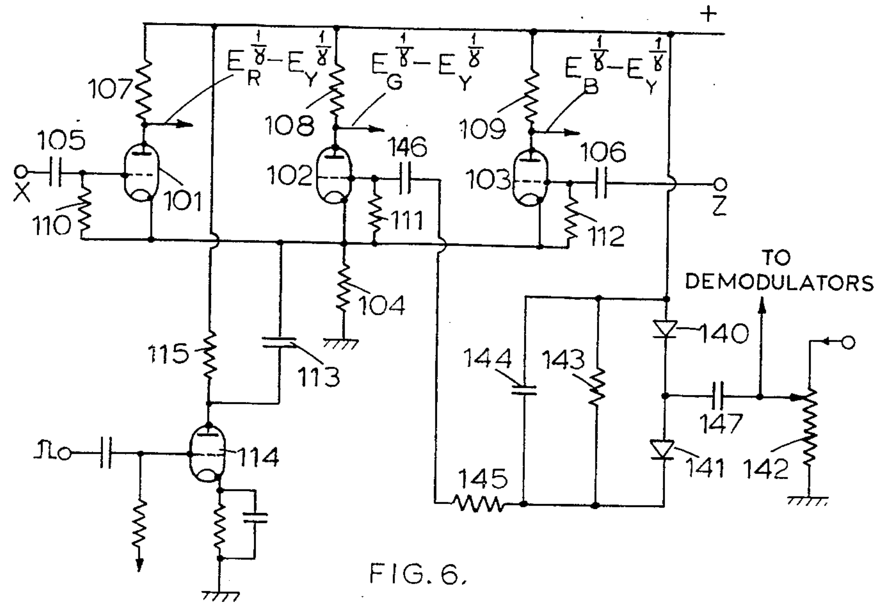
FIGURE 6 illustrates a modification of the circuit illustrated in FIGURE 5.

The matrixing circuit illustrated in FIGURES 5 and 6 are applicable to receivers which have detecting and matrixing circuit operating on the XZ system, or a similar circuit, and according to FIGURES 5 and 6 a voltage of current which is dependent on the colour saturation at any instant, is subtracted in the valve of the detecting and matrixing circuit which produces the green video signal.

Referring to FIGURE 5 the circuit shown illustrates part of a colour television receiver, which is generally of the construction indicated with respect to FIGURE 3, it being again assumed that the receiver has a shadow mask tube having three separate guns. The luminance signal is added to the colour difference signals at the tube, by being applied to the cathodes of the guns. The control electrodes of the valves 101 and 103 are connected respectively via capacitors 105 and 106 to points in the receiver at which there are available the chrominance signals demodulated with respect to the so called X and Z axes. The valves 101, 102 and 103 have anode load resistors 107, 108 and 109 and the control electrodes of these valves are returned to their respective cathodes by way of leak resistors 110, 111 and 112, which may have resistances of 1 megohm. Furthermore, the common cathode connection of the valves 101, 102 and 103 is connected by a capacitor 113 to the anode of a further valve 114, this valve having an anode resistor 115. The control electrode of the valve 114 is connected to receive line blanking pulses of such polarity that a negative pulse is applied to the cathodes of the valves 101, 102 and 103 during each line return interval. This pulse is, moreover, of such amplitude as to cause the valves 101, 102 and 103 to take grid current during the pulse and this has the effect of providing D.C. restoration at the control electrodes of the valves 101, 102 and 103, these control electrodes being, as shown in the drawing, A.C. coupled to the respective signal sources.

The circuit so far described is substantially similar to the XZ detecting and matrixing circuit which is illustrated in FIGURE 9.27, page 246 of Carnt and Townsend, and published by Iliffe Books Ltd., in 1961. However, the control electrode of the valve 102 is not, as shown in the book, returned by the capacitor 116 to the H.T. line 117, but receives a voltage, the amplitude of which is substantially proportional to the amplitude of the chrominance of the sub-carrier. A sample of the chrominance sub-carrier before demodulation is taken from a suitable point in the receiver and fed to the primary winding of a transformer 121. The chrominance sub-carrier voltage appearing across the secondary winding of the transformer 121 is rectified by the rectifier 128, and the unidirectional voltage which is thus obtained is applied via the capacitor 130 to the control electrode of a valve 131. The valve 131 has a cathode load resistor 132 and an anode load resistor 133, and the control electrode of the aforesaid valve 102 is connected via the capacitor 116 to the cathode load resistor 132 so that it receives the required voltage, of which the amplitude is substantially proportional to the amplitude of the chrominance sub-carrier.

To avoid affecting the signals from the valves 101 and 102 a current in antiphase to the voltage which is applied to the control electrode of the valve 102 is taken from the anode load resistor 133 and applied via the capacitor 134 to the common cathode connection of the valves 101, 102 and 103. The resistor 133 is relatively large compared with the common cathode resistor 104 the latter resistor being, for example, 560 ohms. The circuit illustrated has to be set up in such a way than an anode current component should be induced in the valve 102, additional to the normal current which represents $E_V^{1/\gamma}—E_Y^{1/\gamma}$ to correct the green signal. This additional correcting component should not, however, effect the anode currents of the valves 101 and 102 and this entails that the cathode potential of the three valves 101, 102 and 103 should not change when the additional current component aforesaid in the valve 102 is changed. This result is achieved by feeding a current into the cathode circuit which is equal and opposite to the aforesaid additional current component, this current being, as will be appreciated, that obtained from the anode load resistor of the valve 131. On the condition that the resistor 133 has a large resistance compared with the resistor 104, it can be shown that if the cathode resistor of the valve 131 has a value which is approximately the reciprocal of the mutual conductance of the valve 102 plus the ratio of the anode load of the valve 102 to the amplification factor of the said valve, then substantially no potential change occurs at the common cathode connection of the valves 101, 102 and 103 when the additional current component in the valve 102 varies, and the only observed change is in the $E_V^{1/\gamma}—E_Y^{1/\gamma}$ signal so that it approximates more closely to the required signal $E_G^{1/\gamma}—E_Y^{1/\gamma}$. The output signal of the valve 102 is therefore denoted in the drawing as $E_G^{1/\gamma}—E_Y^{1/\gamma}$. To achieve precise balance the resistor 132 may be a preset resistor.

In one practical form of the circuit illustrated, each of the resistors 107, 108 109 is of 15000 ohms. The mutual conductance of the valve 102 is approximately 2 milliamps/volt and the amplification factor of the valve is approximately 17. The cathode resistor of the valve 131 is approximately 1400 ohms.

The circuit illustrated may, of course, be modified in various ways. For example the valve 131 may be in the form of a transistor valve. Alternatively, the valve 131 may be used as a self rectifying valve, to avoid the need for the separate diode 28 for rectifying the chrominance sub-carrier wave. Moreover, instead of obtaining the antiphase current from a current source (such as the anode impedance of the valve 131) in parallel with the common cathode resistor 104 of the valves 101, 102 and 103, the required antiphase current can be produced from a voltage source in series with the common cathode resistance.

The time delays in the circuit illustrated should be adjusted so that the correction signal from the valve 131 occurs at the same time as the G—Y signals.

In the modification of FIGURE 5 which is illustrated in FIGURE 6, the circuit is further simplified by dispensing with the injection of antiphase current from the valve 131 into the cathode resistor 104. The valve 131 is therefore unnecessary and the output of the chrominance sub-carrier wave rectifier is applied directly to the control electrode of the valve 102. A voltage doubling rectifier is used, comprising the diodes 140 and 141, the chrominance sub-carrier wave being applied as shown to the junction of the diodes from the tap of a saturation (or chroma) control potentiometer 142. The chrominance sub-carrier wave output for the X and Z axes is also taken from the tap of the potentiometer 142. The output of the rectifiers is smoothed across the resistor 143 and capacitor 144, and the correcting signal, responsive to the saturation, is applied to the control electrode of the valve 101 by way of a resistor 145 and the capacitor 146. The rectifying circuit is connected directly between the H.T. line and the control electrode and the capacitor 147 isolates the potentiometer 142 from the H.T. The correcting signal applied to the control electrode of the valve 102, in the absence of anti-phase injection into the cathode resistor 104, causes the cathode currents of the valves 101 and 103 to be influenced in response to the saturation, in the sense that as the saturation increases, the outputs of the valves 101 and 103 are increased. This cross-talk, however, acts in such a way as to aid correction, since an increase of the red and blue components has the same effect as a reduction of the green component. Adjustment of the tap on the potentiometer 142 allows the total degree of correction to be varied. The components of FIGURE 6 which have not been referred to are the same as the correspondingly numbered components as FIGURE 5.

The matrixing and decoding circuits illustrated in FIGURES 3 and 5 are not only applicable to receivers having three gun tubes but may also be applied to receivers having single gun tubes, adapted either for signal gated or beam gated operation. In a receiver adapted for signal gated operation, the $E_Y^{1/\gamma}-E_Y^{1/\gamma}$ signal may be reduced by a circuit similar to that illustrated in any of FIGURES 3, 5 and 6. In the case of a receiver adapted for beam gated operation, a reduction of the chrominance signal amplitude can be effected, by a circuit such as illustrated in any of FIGURES 3, 5 and 6 operative at times when the beam is directed to a phosphor strip adapted to emit green light.

The invention can also be applied to closed circuit television in which case the transmission may comprise three signal components representing $E_Y^{1/\gamma}$, $E_R^{1/\gamma}$ and $E_B^{1/\gamma}$ respectively so that the oscillation (the colour sub-carrier wave) which is modulated at different phase angles by $(E_R^{1/\gamma}-E_Y^{1/\gamma})$ and $(E_B^{1/\gamma}-E_Y^{1/\gamma})$ is not transmitted. In this case, in order that a substantially correct green video signal may be obtained at the receiver, means may be provided at the receiver for deriving a correcting signal which is substantially proportional to the square root of the sum of the squares of two colour difference components obtained from $E_Y^{1/\gamma}$, $E_R^{1/\gamma}$ and $E_B^{1/\gamma}$. It will be understood that such a correcting signal corresponds to that proportional to the amplitude of the colour sub-carrier wave in the examples already described. In one form of receiver for closed circuit television (for example, a colour monitor receiver) two subtracting circuits are provided, one arranged to produce $E_R^{1/\gamma}-E_Y^{1/\gamma}$ and the other arranged to produce $E_B^{1/\gamma}-E_Y^{1/\gamma}$. The two colour difference signal components so produced are fed to two balanced modulators, to which are applied respectively carrier waves of the same frequency, but in phase quadrature relationship. The outputs of the balanced modulators are added, and then rectified to produce the required correcting signal. This correcting signal, and the colour difference signal components are then applied to a matrixing circuit in accordance with the invention to produce the green video signal, which is applied to a "green" reproducing tube.

The transmitted red and blue signal components $E_R^{1/\gamma}$ and $E_B^{1/\gamma}$ are also applied to respective "red" and "blue" reproducing tubes.

The invention may also be applied to colour television receivers for receiving signals which accord to the so called SECAM system, or other similar systems in that two colour difference signal components are transmitted alternately by modulation of a sub-carrier wave during alternate line periods, but which differ from the SECAM system in that the luminance signal component represents $E_Y^{1/\gamma}$. In such a receiver the sequential colour difference signals are delayed alternately to provide signal components representing say $(E_R^{1/\gamma}-E_Y^{1/\gamma})$ and $$(E_B^{1/\gamma}-E_Y^{1/\gamma})$$

which are simultaneous with one another and with the receiver luminance signal components $E_Y^{1/\gamma}$. A correcting signal proportional to the square root of the sum of the square of the simultaneous colour difference signals is derived, for example by a circuit such as described in the preceding paragraph, and a matrixing circuit in accordance with the invention is arranged to produce the required red, green and blue video signals.

The forms of the invention illustrated in FIGURES 3, 5 and 6 obtain an approximately correct green signal by linear operations on the three signals $E_Y^{1/\gamma}$, $$(E_R^{1/\gamma}-E_Y^{1/\gamma})$$

and $(E_B^{1/\gamma}-E_Y^{1/\gamma})$ including a subtractive correction in response to a signal which is depending on the amplitude of the chrominance sub-carrier wave.

The invention may also be applied to matrixing circuits which are arranged to respond to a symmetrical colour signal that is a signal comprising colour signal components which are transmitted in such form that the amplitudes are equal for saturated colours of equal intensities.

What we claim is:

1. A matrixing circuit for a colour television receiver comprising input means responsive to a received colour television waveform for providing a luminance signal component representing $E_Y^{1/\gamma}$ and two other signal components which represent respectively two colour differences from $E_Y^{1/\gamma}$, and substantially linear means responsive to said three signal components for deriving colour signal components representing respectively $E_R^{1/\gamma}$, $E_B^{1/\gamma}$, and a component which would in the absence of errors represent $E_G^{1/\gamma}$, said substantially linear means including means for subtracting from the signal component which would in the absence of error represent $E_G^{1/\gamma}$ a correcting signal which is zero for white or grey parts of the picture to be reproduced and which increases with increasing colour saturation of the picture to be reproduced.

2. A matrixing circuit for a colour television receiver comprising input means responsive to a received colour television waveform for providing a luminance signal component and two colour difference signal components, means responsive to said two colour difference signal components for deriving a third colour difference signal component, a cathode ray tube capable of reproducing pictures in colour, means for applying said three colour difference components and said luminance signal component to said cathode ray tube to reproduce a coloured picture, means responsive to at least one signal component provided by said input means for providing a correcting signal which is zero for white or grey parts of the picture to be reproduced and which increases with increasing colour saturation of the picture to be reproduced, and means responsive to said correcting signal for modifying the colour of picture elements so as to reduce the output of one colour which would otherwise be effected by said cathode ray tube relative to the output of another colour, said reduction increasing with increasing colour saturation.

3. A matrixing circuit for a colour television receiver comprising input means responsive to a receiver colour television waveform for providing a luminance signal component and two colour difference signal components, means responsive to said two colour difference signal components for deriving a third colour difference signal component, means responsive to at least one signal component provided by said input means for deriving a corrected signal which is zero for white or grey parts of the picture to be reproduced and which increases with increasing colour saturation of the picture to be reproduced, means for subtracting said correcting signal from said third colour difference signal to derive a corrected third colour difference signal component, and means responsive to said luminance signal component, said two colour difference signal components and said corrected third colour difference signal component for reproducing a coloured picture.

4. A matrixing circuit for a colour television receiver comprising input means responsive to a received colour television waveform for providing a luminance signal component representing $E_Y^{1/\gamma}$ and for providing two colour difference signal components respectively representing $E_R^{1/\gamma}-E_Y^{1\gamma}$ and $E_B^{1/\gamma}-E_Y^{1\gamma}$, means for linearly combining said two colour difference signal components to provide a third colour difference signal component which represents an approximation to $E_G^{1/\gamma}-E_Y^{1/\gamma}$ but is incorrect due to the composition of $E_Y^{1/\gamma}$, means for deriving a correcting signal which is zero for grey or white parts of the picture to be reproduced and which increases with increasing colour saturation of the picture to be reproduced, means for subtracting said correcting signal from said third colour difference signal component to provide a corrected third colour difference signal component, and means responsive to the luminance signal component, said two colour difference signal components and said third corrected colour difference signal component to reproduce a coloured picture.

5. A matrixing circuit for a colour television receiver comprising input means responsive to a received colour television waveform for providing a luminance signal component representing $E_Y^{1/\gamma}$ and an oscillation modulated in phase to represent the hue of the colour to be reproduced and modulated in amplitude to represent the saturation of the colour to be reproduced, a detecting and combining circuit including means for detecting said oscillation along two axes to produce two colour difference signal components representing respectively $E_R^{1/\gamma}-E_Y^{1/\gamma}$ and $E_B^{1/\gamma}-E_Y^{1/\gamma}$, and a third colour difference signal component approximately representing $E_G^{1/\gamma}-E_Y^{1/\gamma}$, said third colour difference signal component being incorrect due to the composition of $E_Y^{1/\gamma}$, means for providing a correcting signal dependent on the amplitude of said oscillation, means for subtracting said signal from said third colour difference signal component to derive a corrected third colour difference signal component and means responsive to said luminance signal component, said two colour difference components and said corrected third colour difference component to reproduce a colour image.

6. A matrixing circuit for a colour television receiver comprising input means responsive to a received colour television waveform for providing a luminance signal component representing $E_Y^{1/\gamma}$ and an oscillation modulated in phase to represent the hue of the colour to be reproduced and modulated in amplitude to represent the saturation of the colour to be reproduced, a detecting and combining circuit including means for detecting said oscillation along two axes to produce two colour difference signal components representing respectively $E_R^{1/\gamma}-E_Y^{1/\gamma}$ and $E_B^{1/\gamma}-E_Y^{1/\gamma}$, and a third colour difference signal component approximately representing $E_G^{1/\gamma}-E_Y^{1/\gamma}$ said third colour difference signal component being incorrect due to the composition of $E_Y^{1/\gamma}$, means for detecting the amplitude of said oscillation to provide a correcting signal which is zero for white or grey parts of the picture to be reproduced and which increases with increasing colour saturation of the picture to be reproduced, means for subtracting said correcting signal from said third colour signal difference component to correct said third colour difference signal component and means responsive to said luminance signal component, said two colour difference signal components and said corrected third colour difference signal component to reproduce a coloured picture.

7. A matrixing circuit according to claim 5 wherein said detecting and combining circuit comprises means to detect the amplitude of said oscillation along X and Z axes respectively, and three valves having control electrodes to two of which are applied the signal components due to said detection along said X and Z axes, said valves being coupled so as to cause said two colour difference signal components and said incorrect third colour difference signal component to appear at their respective output electrodes, and said means for subtracting said correcting signal from said incorrect third colour difference signal components comprising means for applying said correcting signal to the control electrode of that valve at the output electrode of which the third colour difference signal component appears.

8. A matrixing circuit according to claim 7 wherein said valves comprises thermionic valves which are coupled by common cathode impedance and means are provided for injecting current into said cathode impedance to reduce the effect which said correcting signal would otherwise have on said two colour difference signal components.

References Cited by the Examiner

UNITED STATES PATENTS

| | | | |
|---|---|---|---|
| 2,888,514 | 5/1959 | Pritchard | 178—5.4 |
| 3,004,098 | 10/1961 | Gargini | 178—5.4 |

DAVID G. REDINBAUGH, *Primary Examiner.*

ROBERT SEGAL, *Examiner.*